United States Patent
Bansal

(10) Patent No.: US 7,302,631 B2
(45) Date of Patent: Nov. 27, 2007

(54) LOW OVERHEAD CODING TECHNIQUES

(75) Inventor: Akash Bansal, Sunnyvale, CA (US)

(73) Assignee: Rambus Inc., Los Altos, CA (US)

( * ) Notice: Subject to any disclaimer, the term of this patent is extended or adjusted under 35 U.S.C. 154(b) by 445 days.

(21) Appl. No.: 10/892,453

(22) Filed: Jul. 16, 2004

(65) Prior Publication Data

US 2006/0015790 A1 Jan. 19, 2006

(51) Int. Cl.
*H03M 13/00* (2006.01)

(52) U.S. Cl. ........................ 714/775; 714/758

(58) Field of Classification Search ............ 714/775, 714/758
See application file for complete search history.

(56) References Cited

U.S. PATENT DOCUMENTS

| | | | |
|---|---|---|---|
| 3,754,237 A | 8/1973 | de Laage de Meux | |
| 3,771,126 A * | 11/1973 | Apple, Jr. | 714/782 |
| 4,045,771 A * | 8/1977 | Loreck | 714/823 |
| 4,308,557 A * | 12/1981 | Dieterich | 386/124 |
| 4,367,549 A * | 1/1983 | Vachee | 370/304 |
| 4,408,189 A | 10/1983 | Betts et al. | |
| 4,486,739 A | 12/1984 | Franaszek et al. | |
| 4,495,626 A | 1/1985 | Brunin et al. | |
| 4,665,517 A | 5/1987 | Widmer | |
| 4,667,337 A | 5/1987 | Fletcher | |
| 4,855,742 A | 8/1989 | Verboom | |
| 4,866,719 A * | 9/1989 | Morgan et al. | 714/704 |
| 5,142,167 A | 8/1992 | Temple et al. | |
| 5,655,078 A | 8/1997 | Anderson et al. | |
| 5,903,231 A | 5/1999 | Emelko | |
| 5,999,571 A | 12/1999 | Shin et al. | |
| 6,005,895 A | 12/1999 | Perino et al. | |
| 6,018,304 A | 1/2000 | Bessios | |
| 6,031,472 A | 2/2000 | Johnson et al. | |
| 6,067,326 A | 5/2000 | Jonsson et al. | |
| 6,078,627 A | 6/2000 | Crayford | |
| 6,094,461 A | 7/2000 | Heron | |
| 6,226,330 B1 | 5/2001 | Mansur | |
| 6,324,602 B1 | 11/2001 | Chen et al. | |
| 6,538,584 B2 | 3/2003 | Borkar et al. | |
| 6,731,692 B1 | 5/2004 | Bhoja | |
| 2003/0108134 A1 | 6/2003 | Stonick et al. | |
| 2003/0152154 A1 | 8/2003 | Johnson | |

OTHER PUBLICATIONS

Mrcea R. Stan et al., "Coding a terminated bus for low power," Great Lakes Sympon VLSI., Mar. 1995, pp. 70-73.

(Continued)

*Primary Examiner*—Joseph D. Torres
(74) *Attorney, Agent, or Firm*—Hunton & Williams LLP

(57) ABSTRACT

A low overhead coding technique is disclosed. In one particular exemplary embodiment, the low overhead coding technique may be realized as a method for coding information comprising receiving a block of information, and encoding the block of information such that a first value of a first symbol in the encoded block of information is not equal to a second value of an adjacent second symbol in the encoded block of information or a third value of an adjacent last symbol in a previously encoded block of information.

22 Claims, 17 Drawing Sheets

OTHER PUBLICATIONS

Mrcea R. Stan, "Bus-Invert coding for low power I/O," IEEE Transactions On Very Large Scale Integration (VLSI) Systems, vol. XX, No. Y, 1999, pp. 100-108.

Kazuyuki Nakamura et al., A 500-MHz 4-Mb CMOS pipeline-burst cache SRAM with point-to-point noise reduction coding I/O, date unknown.

David D. Falconer et al., "Bounds on error-pattern probabilities for digital communications systems," IEEE Transactions Communications, vol. COM-20, No. 2, Apr. 1972, pp. 132-139.

Ramin Farjad-Rad et al., "A 0.3-µm CMOS 8-Gb/s 4-PAM serial link transceiver," IEEE Journal of Solid-State Circuits, vol. 35, No. 5, May 2000.

A. X. Widmer et al., "A dc-balanced, partitioned-block, 8B/10B transmission code," pp. 440-451, date unknown.

Burton R. Saltxberg, "Intersymbol Interference Error Bounds with Application to Ideal Bandlimited Signaling," IEEE Transactions on Information Theory, vol. IT-14, No. 4, Jul. 1968, pp. 563-568.

Kees A. Schouhamer Immink, "Runlength-Limited Sequences," Proceedings Of The IEEE, vol. 78, No. 11, Nov. 1990, pp. 1745-1759.

VSC1129, Vitesse, 5—6.5 Gb/s Quad Backplane Transceiver & Concentrator, Backplane Product Brochure, 2 pages, date unknown.

IEEE Standards, 802.3ae, Part 3: Carrier sense multiple access with collision detection (CSMA/CD) access method and physical layer specifications, Amendment: Media access control (MAC) Parameters, Physical layers, and management parameters for 10 Gb/s operation, Aug. 30, 2002, pp. 1-516.

* cited by examiner

| Input Payload Block | sync | Output Payload Block | | | | | | | | |
|---|---|---|---|---|---|---|---|---|---|---|
| Bit Position / Block Format | 0 1 | 2 | | | | | | | | 65 |
| $D_0D_1D_2D_3D_4D_5D_6D_7$ | 01 | $D_0$ | $D_1$ | $D_2$ | $D_3$ | $D_4$ | $D_5$ | $D_6$ | $D_7$ | |
| Block Format | | Block Type Field | | | | | | | | |
| $C_0C_1C_2C_3C_4C_5C_6C_7$ | 10 | 0x1e | $C_0$ | $C_1$ | $C_2$ | $C_3$ | $C_4$ | $C_5$ | $C_6$ | $C_7$ |
| $C_0C_1C_2C_3/O_4D_5D_6D_7$ | 10 | 0x2d | $C_0$ | $C_1$ | $C_2$ | $C_3$ | $O_4$ | $D_5$ | $D_6$ | $D_7$ |
| $C_0C_1C_2C_3/S_4D_5D_6D_7$ | 10 | 0x33 | $C_0$ | $C_1$ | $C_2$ | $C_3$ | | $D_5$ | $D_6$ | $D_7$ |
| $O_0D_1D_2D_3/S_4D_5D_6D_7$ | 10 | 0x66 | $D_1$ | $D_2$ | $D_3$ | $O_0$ | | $D_5$ | $D_6$ | $D_7$ |
| $O_0D_1D_2D_3/O_4D_5D_6D_7$ | 10 | 0x55 | $D_1$ | $D_2$ | $D_3$ | $O_0$ | $O_4$ | $D_5$ | $D_6$ | $D_7$ |
| $S_0D_1D_2D_3/D_4D_5D_6D_7$ | 10 | 0x78 | $D_1$ | $D_2$ | $D_3$ | $D_4$ | | $D_5$ | $D_6$ | $D_7$ |
| $O_0D_1D_2D_3/C_4C_5C_6C_7$ | 10 | 0x4b | $D_1$ | $D_2$ | $D_3$ | $O_0$ | $C_4$ | $C_5$ | $C_6$ | $C_7$ |
| $T_0C_1C_2C_3/C_4C_5C_6C_7$ | 10 | 0x87 | | $C_1$ | $C_2$ | $C_3$ | $C_4$ | $C_5$ | $C_6$ | $C_7$ |
| $D_0T_1C_2C_3/C_4C_5C_6C_7$ | 10 | 0x99 | $D_0$ | | $C_2$ | $C_3$ | $C_4$ | $C_5$ | $C_6$ | $C_7$ |
| $D_0D_1T_2C_3/C_4C_5C_6C_7$ | 10 | 0xaa | $D_0$ | $D_1$ | | $C_3$ | $C_4$ | $C_5$ | $C_6$ | $C_7$ |
| $D_0D_1D_2T_3/C_4C_5C_6C_7$ | 10 | 0xb4 | $D_0$ | $D_1$ | $D_2$ | | $C_4$ | $C_5$ | $C_6$ | $C_7$ |
| $D_0D_1D_2D_3/T_4C_5C_6C_7$ | 10 | 0xcc | $D_0$ | $D_1$ | $D_2$ | $D_3$ | | $C_5$ | $C_6$ | $C_7$ |
| $D_0D_1D_2D_3/D_4T_5C_6C_7$ | 10 | 0x12 | $D_0$ | $D_1$ | $D_2$ | $D_3$ | $D_4$ | | $C_6$ | $C_7$ |
| $D_0D_1D_2D_3/D_4D_5T_6C_7$ | 10 | 0xef | $D_0$ | $D_1$ | $D_2$ | $D_3$ | $D_4$ | $D_5$ | | $C_7$ |
| $D_0D_1D_2D_3/D_4D_5D_6T_7$ | 10 | 0xff | $D_0$ | $D_1$ | $D_2$ | $D_3$ | $D_4$ | $D_5$ | $D_6$ | |

Figure 1

| 4-PAM symbol | Weight | Inverted 4-PAM symbol |
|---|---|---|
| 00 | +3 | 10 |
| 01 | +1 | 11 |
| 11 | -1 | 01 |
| 10 | -3 | 00 |

Figure 7

| FRAME bits | Combination use |
|---|---|
| 00 | Unqualified set |
| 01 | Qualified - Data |
| 10 | Qualified - Control |
| 11 | Unqualified set |

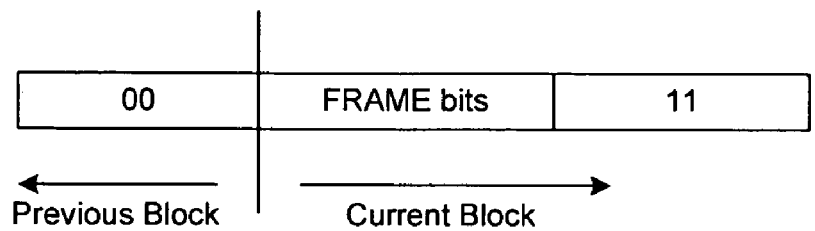

| FRAME bits | Combination use |
|---|---|
| 0000 | Unqualified set |
| 0001 | Unqualified set |
| 0010 | Unqualified set |
| 0011 | Unqualified set |
| 0100 | Qualified - Data, Parity 0 |
| 0101 | Qualified - Control, Parity 0 |
| 0110 | Qualified - Data Inverted, Parity 0 |
| 0111 | Unqualified set |
| 1000 | Qualified - Control Inverted, Parity 0 |
| 1001 | Qualified - Data, Parity 1 |
| 1010 | Qualified - Control, Parity 1 |
| 1011 | Unqualified set |
| 1100 | Qualified - Data Inverted, Parity 1 |
| 1101 | Qualified - Control Inverted, Parity 1 |
| 1110 | Reserved |
| 1111 | Unqualified set |

Figure 11

| PAM type | 64b/66b Rules (need 2 valid combinations) | 64b/68b Rules (need 8 valid combinations) |
|---|---|---|
| 2-PAM | Minimum 1 transition<br>Frame bits in qualified set: 2 combinations<br>01: Data<br>10: Control | Minimum 1 transition<br>Frame bits in qualified set: 8 combinations<br>Rule: Ensure transition with the 1st payload bit in the current block |
| 4-PAM | Minimum 2 transitions<br>Frame bits in qualified set: 2 combinations<br>Rule: Ensure transition with the 1st payload symbol in the current block and last payload symbol in previous block | Minimum 2 transitions<br>Frame bits in qualified set: 9 combinations<br>Rule: Ensure transition with the 1st payload symbol in the current block and last payload symbol in previous block |
| 8-PAM | Minimum 2 transitions<br>Frame bits in qualified set: 2 combinations<br>Rule: Ensure transition with the 1st payload symbol in the current block and last payload symbol in previous block | Minimum 2 transitions<br>Frame bits in qualified set: 10 combinations<br>Rule: Ensure transition with the 1st payload symbol in the current block. The first 2 data payload bits are not equal to corresponding bits in the frame symbol |
| 16-PAM | Minimum 2 transitions<br>Frame bits in qualified set: 2 combinations<br>Rule: Ensure transition with the 1st payload symbol in the current block and last payload symbol in previous block | Minimum 2 transitions<br>Frame bits in qualified set: 14 combinations<br>Rule: Ensure transition with the 1st payload symbol in the current block and last payload symbol in previous block |
| $2^n$ PAM (where n>4) | Minimum 2 transitions<br>Frame bits in qualified set: 2 combinations<br>Rule: Ensure transition with the 1st payload symbol in the current block and last payload symbol in previous block | Minimum 2 transitions<br>Frame bits in qualified set: 14 combinations<br>Rule: Ensure transition with the 1st payload symbol in the current block and last payload symbol in previous block |

Figure 13

LOW OVERHEAD CODING TECHNIQUES

FIELD OF THE DISCLOSURE

The present disclosure relates generally to high speed signaling systems and, more particularly, to a low overhead coding technique for use in high speed signaling systems.

BACKGROUND OF THE DISCLOSURE

High-speed AC-coupled serial link channels delivering an effective transmission rate above 5 Gigabits per second (Gbps) in a backplane environment are subject to significant signaling challenges. For example, inter-symbol interference (ISI) may be introduced due to a significant DC component in a transmitted data stream. Attenuation caused by conductor and dielectric losses also causes dispersion ISI. Another important ISI component is reflections, which are essentially multipath components of a signal and originate from impedance discontinuities such as those caused by connectors of line cards at both transmit and receive ends. In addition to ISI distortion, cross-talk effects from far and near end adjacent channels is becoming increasingly significant in high-speed serial link channels.

Transmitters and receivers are required to compensate for most signal distortion using very low complexity schemes in order to obtain a target bit error rate (BER) of less than or equal to $10^{-17}$ at Gbps rates and under severe power and complexity restrictions. This constrained space presents significant challenges to well-known signal processing techniques, and sub-optimal but efficient alternatives are sometimes needed to fulfill the task.

For example, to counteract DC balance and channel attenuation at high bit rates, coding schemes are often employed. Specifically, coding schemes may improve transmission characteristics by reducing ISI, providing improved DC balancing properties, provide transitions for use by receivers, and providing improved BER through error detection and correction. In addition, coding schemes may also provide framing (i.e., byte boundaries), as well as provide protocol support through the use of control characters.

The most popular coding scheme, which is used primarily in non-return to zero (NRZ) signaling systems, is an 8-bit/10-bit (8b/10b) coding scheme. In the 8b/10b coding scheme, an 8-bit byte is coded into a 10-bit byte, resulting in an overhead of 25%. As transmission rates scale to more than 5 Gbps, the need for bandwidth saving techniques in coding become necessary. This is even more imperative for bandwidth limited channels.

A committee of the Institute for Electrical and Electronic Engineers (IEEE) working on standardizing 10G Ethernet has established a 64-bit/66-bit (64b/66b) coding scheme. In accordance with the IEEE 64b/66b standard, a 64-bit payload block is coded into a 66-bit payload/synchronization block, resulting in an overhead of 3.125%. The extra two bits in the 66-bit payload/synchronization block are synchronization bits for indicating whether the remaining 64 bits in the 66-bit payload/synchronization block contain control bits, as shown in FIG. 1. The two synchronization bits in the IEEE 64b/66b standard also guarantee that at least one transition is present in every 66-bit payload/synchronization block. The IEEE 64b/66b standard is also beneficial in that it allows 10 Gigabits (Gb) of real data to be transmitted at 10.3125 Gbps.

However, the IEEE 64b/66b standard is deficient in several regards. For example, the IEEE 64b/66b standard does not provide for DC guaranteed balancing, which is necessary so that the common mode voltage at a receiver remains bounded within known values. Without DC balancing, receiver sensitivity is compromised. Also, while the IEEE 64b/66b standard supports NRZ and 2-level pulse amplitude modulation (2-PAM) signaling schemes, it does not support 4-PAM or multi-PAM signaling schemes, which allow for significant increases in bandwidth. Furthermore, the IEEE 64b/66b standard does not address error detection, which is a crucial parameter in many systems. Additionally, the IEEE 64b/66b standard guarantees only one transition in every 66-bit payload/synchronization block, which is often insufficient for clock recovery operations.

In view of the foregoing, it would be desirable to provide a low overhead coding technique which overcomes the above-described inadequacies and shortcomings of the IEEE 64b/66b standard and other coding schemes.

SUMMARY OF THE DISCLOSURE

A low overhead coding technique is disclosed. In one particular exemplary embodiment, the low overhead coding technique may be realized as a method for coding information comprising receiving a block of information, and encoding the block of information such that a first value of a first symbol in the encoded block of information is not equal to a second value of an adjacent second symbol in the encoded block of information or a third value of an adjacent last symbol in a previously encoded block of information.

In another particular exemplary embodiment, the low overhead coding technique may be realized as a method for coding information comprising receiving an encoded block of information formed with N bits that are evenly divided into M total symbols, wherein the encoded block of information includes P framing bits represented by one or more of the M total symbols, wherein a first value of a first symbol in the encoded block of information is not equal to a second value of an adjacent second symbol in the encoded block of information or a third value of an adjacent last symbol in a previously encoded block of information. The method also comprises detecting the P framing bits in the encoded block of information.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 1 illustrates 66-bit payload/synchronization block formats in accordance with the IEEE 64b/66b standard.

FIG. 7 is a table containing all possible symbol configurations in a 4-PAM signaling system in a first column, the weight of each of the 4-PAM symbols in a second column, and the respective inverted symbol configurations in a third column in accordance with an embodiment of the present disclosure.

FIG. 11 is a table containing 16 possible frame bit combinations when the low overhead encoder of FIG. 3 is operating in accordance with a 4-PAM signaling scheme and a low overhead 64b/68b coding technique in accordance with an embodiment of the present disclosure.

FIG. 13 is a table listing the rules for the low overhead encoder of FIG. 3 when operating in accordance with all $2^n$ PAM signaling schemes and one of the low overhead 64b/66b coding technique and the low overhead 64b/68b coding technique in accordance with an embodiment of the present disclosure.

DETAILED DESCRIPTION OF EXEMPLARY EMBODIMENT(S)

The present disclosure relates to a low overhead coding technique which may be used, for example, in the transmission of data over serial links. The low overhead coding technique has several variations, each of which having one or more of the following unique features: 1.) amenability for use in a multi-PAM signaling environment; 2.) at least two transitions are guaranteed in every payload/framing block; 3.) guaranteed DC balancing in a multi-PAM signaling environment within a certain bound; 4.) error detection through parity calculation for every payload/framing block; and 5.) support for independent multiplexing of many thin streams (i.e., unbonded protocol support).

In a first embodiment, the low overhead coding technique may be realized as a low overhead 64-bit/66-bit (64b/66b) coding technique. Similar to the IEEE 64b/66b standard, in the low overhead 64b/66b coding technique, a 64-bit payload block is coded into a 66-bit payload/framing block, resulting in an overhead of 3.125%. However, the low overhead 64b/66b coding technique differs from the IEEE 64b/66b standard in that the low overhead 64b/66b coding technique: 1.) may be used in a multi-PAM signaling environment; 2.) guarantees that at least two transitions are present in every payload/framing block; and 3.) supports independent multiplexing of many thin streams (i.e., unbonded protocol support).

In a second embodiment, the low overhead coding technique may be realized as a low overhead 64-bit/68-bit (64b/68b) coding technique. Unlike the IEEE 64b/66b standard, in the low overhead 64b/68b coding technique, a 64-bit payload block is coded into a 68-bit payload/framing block, resulting in an overhead of 6.25%. The low overhead 64b/68b coding technique also differs from the IEEE 64b/66b standard in that the low overhead 64b/68b coding technique: 1.) may be used in a multi-PAM signaling environment; 2.) guarantees that at least two transitions are present in every payload/framing block; 3.) guarantees DC balancing in a multi-PAM signaling environment within a certain bound; 4.) allows error detection through parity calculation for every payload/framing block; and 5.) supports independent multiplexing of many thin streams (i.e., unbonded protocol support).

Figure 2:
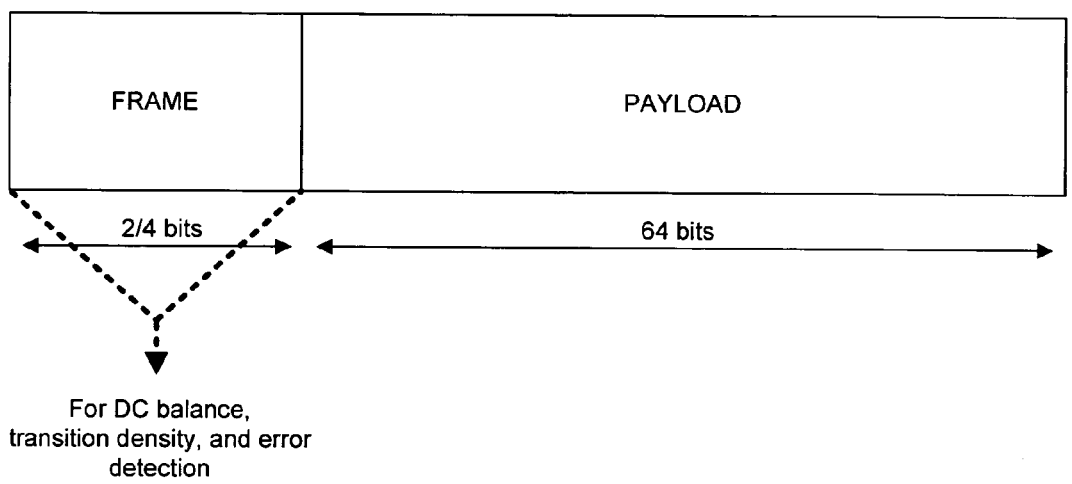
FIG. 2 illustrates the format of a payload/framing block encoded in accordance with an embodiment of the low overhead coding technique of the present disclosure.

Referring to FIG. 2, there is shown an illustration of the format of a payload/framing block encoded in accordance with an embodiment of the low overhead coding technique of the present disclosure. As shown in FIG. 2, the encoded payload/framing block has 64 bits of payload along with a number of extra frame bits depending upon which variation of the low overhead coding technique is being implemented. For example, in the low overhead 64b/66b coding technique discussed above, there are 2 frame bits. Alternatively, in the low overhead 64b/68b coding technique discussed above, there are 4 frame bits.

The 64 bits of payload can be either data bits or control bits, or a combination thereof. If there is one or more control bits in the 64 bits of payload, the payload is considered a control payload. Otherwise, the payload is considered a data payload. The payload may be in an inverted state or a non-inverted state. This ability to invert the payload is required to guarantee DC balancing. For error detection, the parity of the payload may be calculated.

As described in further detail below, the frame bits may be used to indicate: 1.) whether the 64 bits of payload is a control payload or a data payload; 2.) whether the 64 bits of payload is in an inverted state or a non-inverted state; and 3.) whether the 64 bits of payload has odd parity or even parity. Of course, the frame bits may also be used to identify the start of a payload/framing block. For example, in the low overhead 64b/66b coding technique discussed above, the 2 frame bits may be used to indicate whether the 64 bits of payload is a control payload or a data payload. Alternatively, in the low overhead 64b/68b coding technique discussed above, the 4 frame bits may be used to indicate whether the 64 bits of payload is a control payload or a data payload, whether the 64 bits of payload is in an inverted state or a non-inverted state, and whether the 64 bits of payload has odd parity or even parity.

Figure 3:
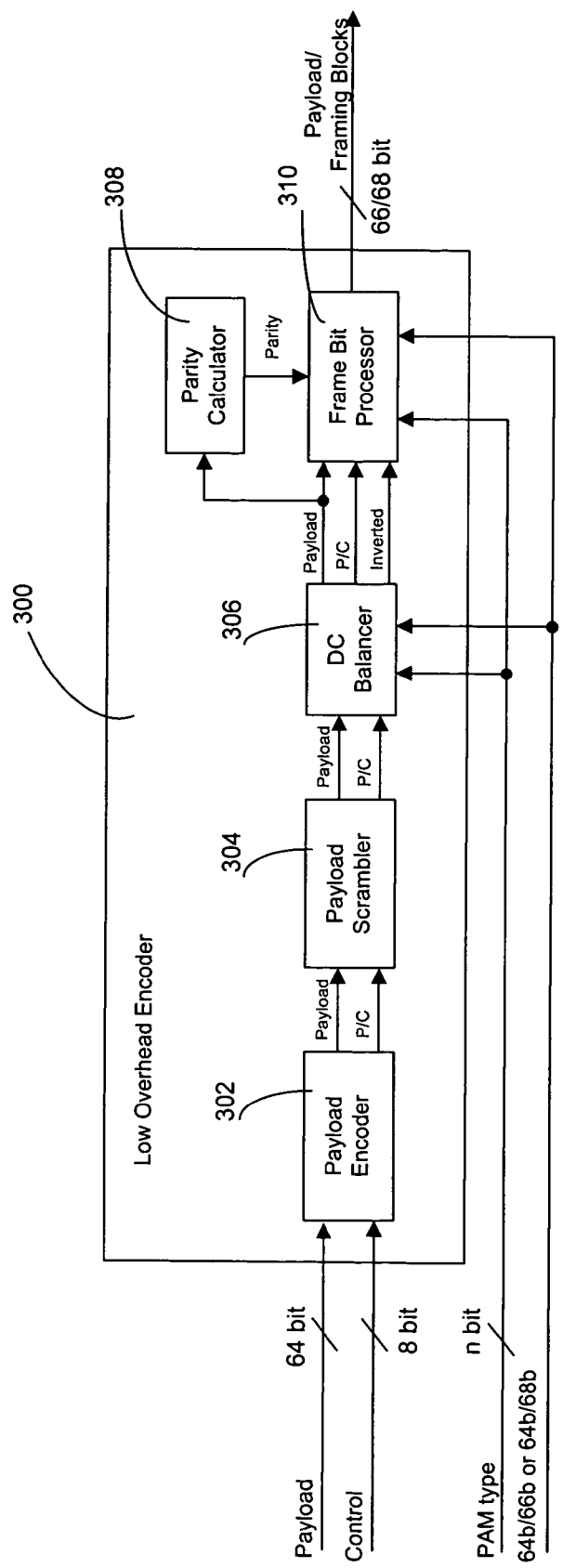
FIG. 3 shows a block diagram of a low overhead encoder in accordance with an embodiment of the present disclosure.

Referring to FIG. 3, there is shown block diagram of a low overhead encoder 300 in accordance with an embodiment of the present disclosure. The low overhead encoder 300 comprises a payload encoder 302, a payload scrambler 304, a DC balancer 306, a parity calculator 308, and a frame bit processor 310. The low overhead encoder 300 receives a 64-bit payload block and a corresponding 8-bit control byte. The 8-bit control byte indicates whether the 64-bit payload block is a control payload or a data payload. That is, the 64-bit payload block may be broken down into eight 8-bit payload bytes. Each bit in the 8-bit control byte may then correspond to a respective one of the eight 8-bit payload bytes. The state of each bit in the 8-bit control byte indicates whether a respective one of the eight 8-bit payload bytes contains control information or data information. For example, if the state of a bit in the 8-bit control byte is a logic "1", then a respective one of the eight 8-bit payload bytes may contain control information. Alternatively, if the state of a bit in the 8-bit control byte is a logic "0", then a respective one of the eight 8-bit payload bytes may contain data information. Of course, the reverse is also possible.

The low overhead encoder 300 also receives coding mode signal (i.e., 64b/66b or 64b/68b) and n-bit PAM type signal (i.e., PAM type). The state of the coding mode signal (i.e., 64b/66b or 64b/68b) indicates the coding mode in which the low overhead encoder 300 is to operate. For example, if the state of the coding mode signal (i.e., 64b/66b or 64b/68b) is a logic "1", then the low overhead encoder 300 may operate according to the low overhead 64b/66b coding technique discussed above. Alternatively, if the state of the coding mode signal (i.e., 64b/66b or 64b/68b) is a logic "0", then the low overhead encoder 300 may operate according to the low overhead 64b/68b coding technique discussed above. Of course, the reverse is also possible.

The n-bit PAM type signal (i.e., PAM type) indicates the level of PAM signaling in which the low overhead encoder 300 is to operate. For example, the low overhead encoder 300 may operate with virtually any number of PAM signaling schemes (e.g., 2-PAM, 4-PAM, 8-PAM, etc.). Thus, the n-bit PAM type signal (i.e., PAM type) may be a 2-bit signal having four different combinations of binary values each representing one type of PAM signaling scheme. Generally, the low overhead encoder 300 may operate with PAM signaling schemes derived from any power of 2 that is 1 or more. For example, 2-PAM is 2 to the 1st, 4-PAM is 2 to the 2nd, 8-PAM is 2 to the 3rd, 16-PAM is 2 to the $4^{th}$, and so on.

Based upon the inputs just described, the low overhead encoder 300 may generate either a 66-bit or a 68-bit payload/framing block. As described above, the 66-bit payload/framing block generated in accordance with the low overhead 64b/66b coding technique contains 64 payload bits and 2 frame bits, whereas the 68-bit payload/framing block generated in accordance with the low overhead 64b/68b coding technique contains 64 payload bits and 4 frame bits.

At this point it should be noted that other low overhead coding techniques which may receive variations of the inputs just described are possible within the scope of the present disclosure. The only limitation to the low overhead coding techniques that fall within the scope of the present disclosure is that the total number of bits in the payload/framing block must be an integer number of PAM symbols. That is, the total number of bits in each payload/framing block is dependent upon: 1.) the number of bits in the payload block; 2.) the number of added framing bits; and 3.) the level of PAM signaling (e.g., 4-PAM codes have 2 bits per symbol, 8-PAM codes have 3 bits per symbol, etc.). To determine whether the total number of bits in the payload/framing block has an integer number of PAM symbols, the number of bits in the payload/framing block is divided by the number of bits per symbol for the applicable PAM mode. For example, if you have a payload block of 64 bits (=32 4-PAM symbols) plus 2 additional framing bits, there is a total of 66 bits in the payload/framing block. To check if the total number of bits in the payload/framing block has an integer number of PAM symbols, 66 (i.e., total number of bits in the payload/framing block) is divided by 2 (since 4-PAM symbols have 2 bits each) to arrive at 33. Thus, since 33 is an integer, the total number of bits in the payload/framing block is an integer number of PAM symbols.

Figure 4:
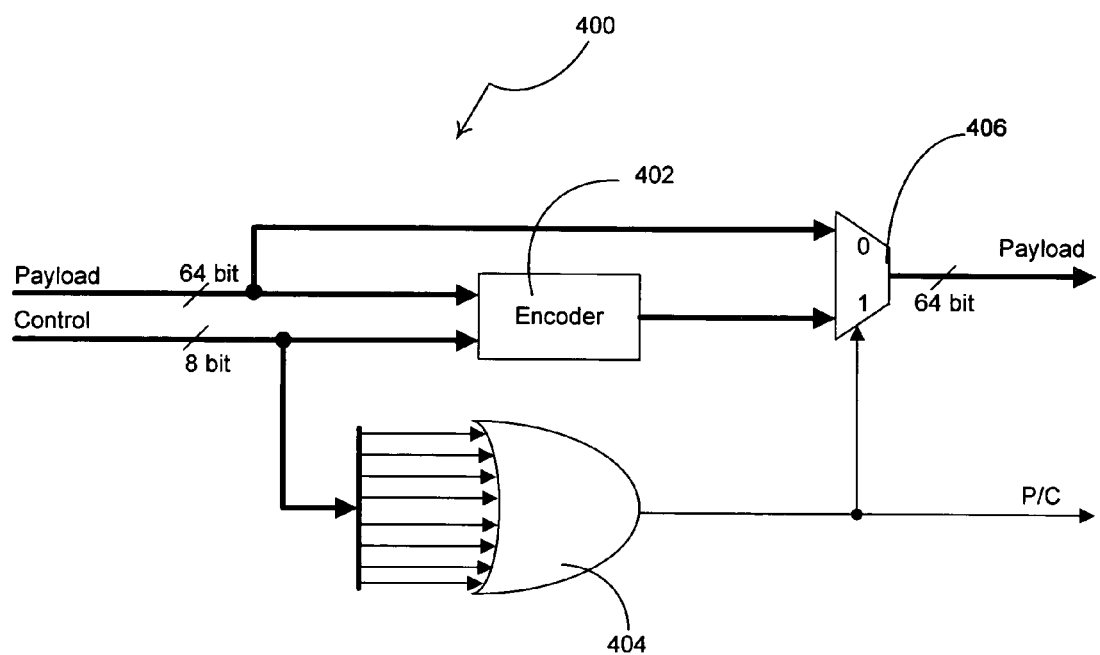
FIG. 4 shows a payload encoder that may be used in the low overhead encoder of FIG. 3 in accordance with an embodiment of the present disclosure.
Figure 5:
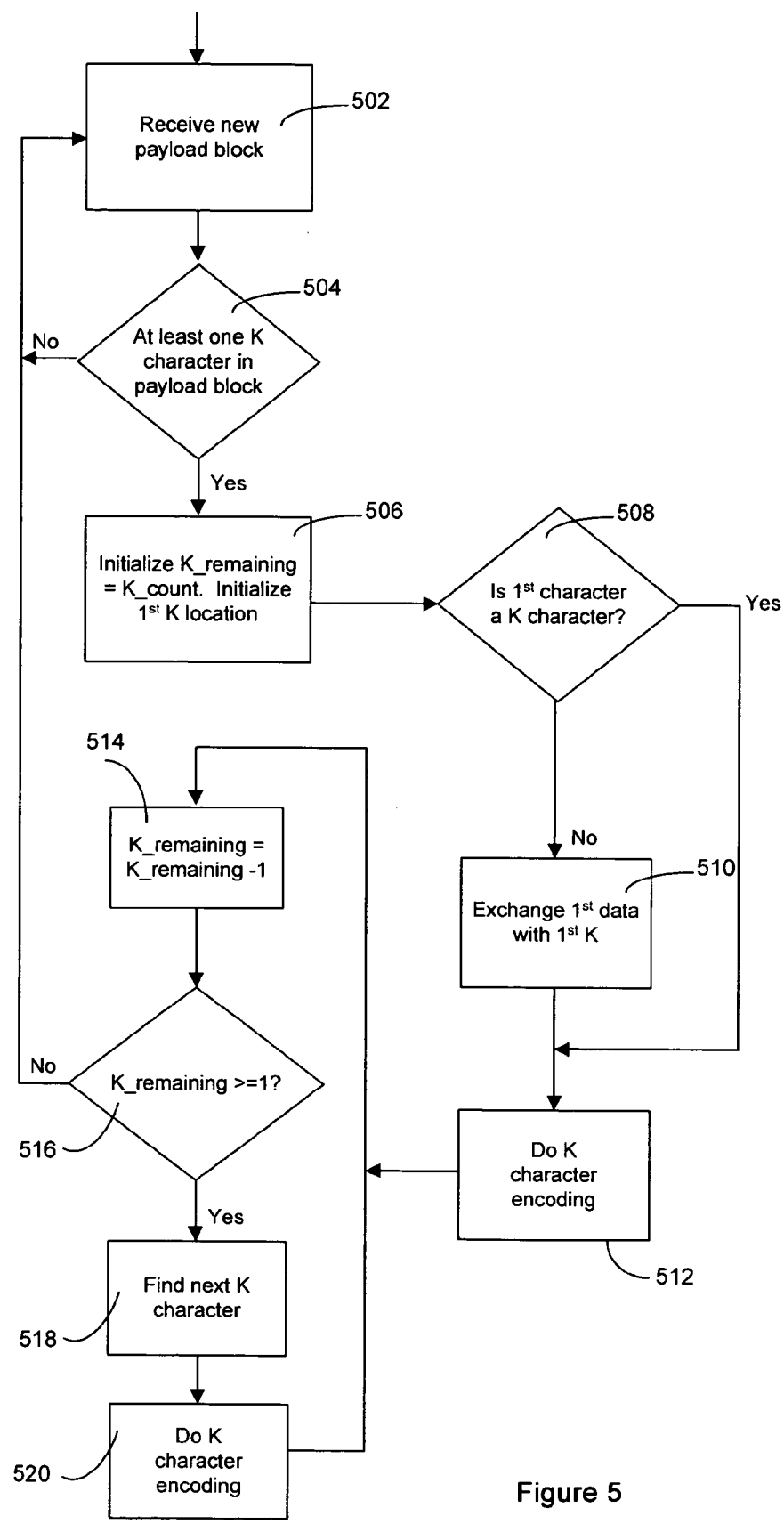
FIG. 5 shows an encoding algorithm which may be performed by the encoder of FIG. 4 in accordance with an embodiment of the present disclosure.

Referring to FIG. 4, there is shown a payload encoder 400 that may be used in the low overhead encoder 300 of FIG. 3 in accordance with an embodiment of the present disclosure. The payload encoder 400 comprises an encoder 402, an 8-input logical "OR" device, and a multiplexer 406. The encoder 402 receives the 64-bit payload block and the corresponding 8-bit control byte, and operates to encode the 64-bit payload block according to the algorithms set forth in FIGS. 5 and 6. That is, as shown in FIG. 5, the encoder 402 receives a new payload block in step 502. In step 504, the encoder 402 determines whether there is at least one control (K) character in the received payload block. If not, the encoder 402 returns to step 502. If so, the encoder 402 initializes a control (K) character count in step 506. Then, in step 508, the encoder 402 determines whether the first character is a control (K) character. If so, the encoder 402 performs control (K) character encoding in step 512. If not, the encoder 402 exchanges a first data character with the first control (K) character in step 510. Then, the encoder 402 performs control (K) character encoding in step 512 (see FIG. 6).

After the control (K) character has been encoded, the control (K) character count is decremented in step 514. Then, in step 516, the encoder 402 determines whether the control (K) character count is greater than or equal to 1. If not, the encoder 402 returns to step 502. If so, the encoder 402 operates to find the next control (K) character in step 518. Then, the encoder 402 performs control (K) character encoding in step 520 (see FIG. 6).

Figure 6:
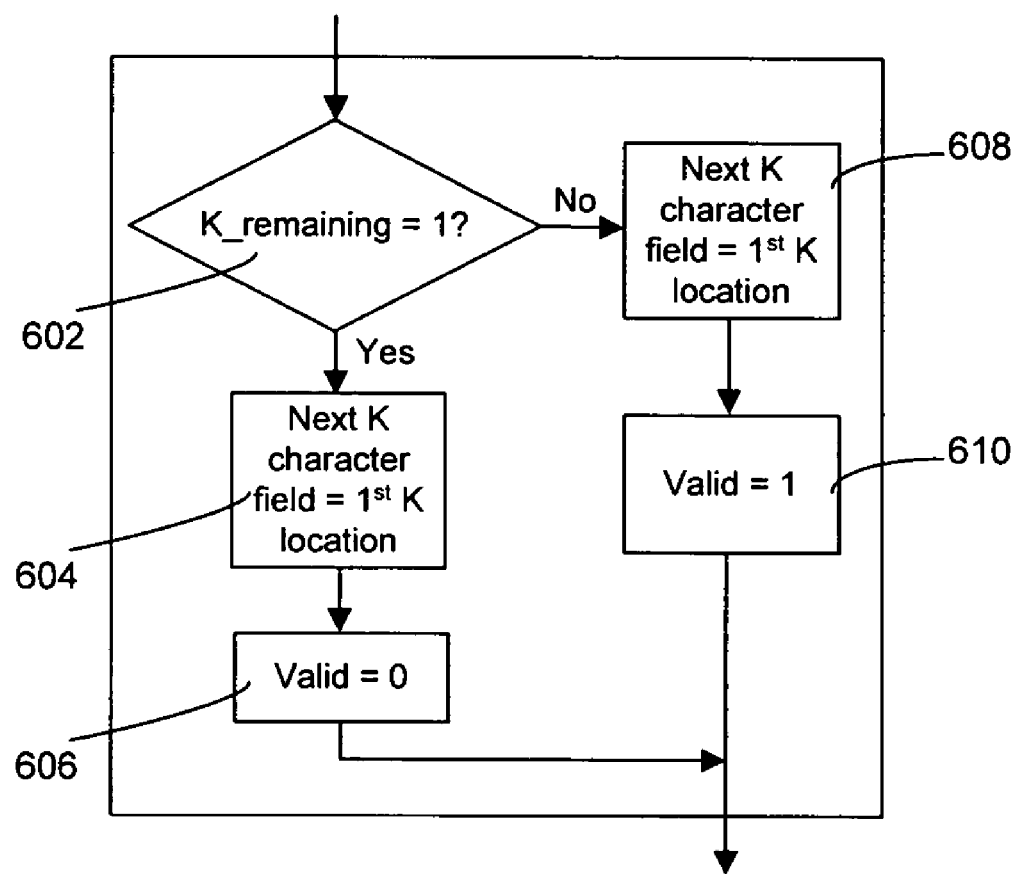
FIG. 6 shows a detailed portion of the encoding algorithm which may be performed by the encoder of FIG. 4 in accordance with an embodiment of the present disclosure.

Referring to FIG. 6, the encoder 402 performs control (K) character encoding, as described above in steps 512 and 520 of FIG. 5, by first determining whether the control (K) character count is equal to 1 in step 602. If so, the encoder 402 assigns a next control (K) character field to be a first control (K) character location in step 604. Then, in step 606, the encoder 402 inserts a logic "0" in a valid bit of the control (K) character, thereby indicating that there is not a control (K) character immediately following the present control (K) character. If not, the encoder 402 assigns a next control (K) character field to be a first control (K) character location in step 608. Then, in step 610, the encoder 402 inserts a logic "1" in a valid bit of the control (K) character, thereby indicating that there is a control (K) character immediately following the present control (K) character.

Referring again to FIG. 4, the encoder 402 may be implemented in multiple different forms. For example, the encoder 402 may be implemented with discrete logic, one or more integrated circuit devices, an application specific integrated circuit (ASIC), one or more programmable logic devices, one or more programmable processing devices, or any combination thereof.

The 8-input logical "OR" device 404 receives the 8-bit control byte, and operates to generate a payload/control (P/C) signal indicating whether the corresponding 64-bit payload block is a control payload or a data payload. For example, if, as described above, the state of a bit in the 8-bit control byte being a logic "1" indicates that a respective one of the eight 8-bit payload bytes may contain control information, then the payload/control (P/C) signal will be a logic "1" if control information is present in any portion of the 64-bit payload block. Alternatively, the payload/control (P/C) signal will be a logic "0" if no control information is present in any portion of the 64-bit payload block.

The multiplexer 406 receives the uncoded 64-bit payload block at one input and an encoded 64-bit payload block from the encoder 402 at another input, and operates according to the state of the payload/control (P/C) signal output from the 8-input logical "OR" device 404. That is, when the payload/control (P/C) signal is a logic "0" (thus indicating that no control information is present in any portion of the 64-input payload block), then the multiplexer 406 allows the uncoded 64-bit payload block to pass therethrough. Alternatively, when the payload/control (P/C) signal is a logic "1" (thus indicating that control information is present in at least some portion of the 64-bit payload block), then the multiplexer 406 allows the encoded 64-bit payload block to pass therethrough. Thus, either the uncoded 64-bit payload block or encoded 64-bit payload block is output from the payload encoder 400.

Referring again to FIG. 3, the payload scrambler 304 operates to randomize either an uncoded 64-bit payload block or an encoded 64-bit payload block received from the payload encoder 302. For example, the payload scrambler 304 may operate to randomize the uncoded 64-bit payload block or the encoded 64-bit payload block received from the payload encoder 302 using a 1+x39+x58 scrambling polynomial. Such a randomizing function is common in many code-based signaling systems. It should be noted, however, that the payload scrambler 304 is an optional feature of the low overhead encoder 300. Thus, the payload scrambler 304 may be omitted from the low overhead encoder 300 in alternative embodiments.

The DC balancer 306 operates to either invert or not invert symbols in either a scrambled uncoded 64-bit payload block or a scrambled encoded 64-bit payload block received from the payload scrambler 304. To perform this DC balancing process, the DC balancer 306 maintains a running symbol weight disparity that is calculated from the symbol weights of a number of previously received payload blocks. The DC balancer 306 also calculates the symbol weight of a currently received payload block. To determine whether symbols in the currently received payload block may be inverted, the DC balancer 306 compares the symbol weight of the currently received payload block to the running symbol weight disparity of the number of previously received payload blocks. If the symbol weight of the currently received payload block and the running symbol weight disparity of the number of previously received payload blocks have a common polarity, then symbols in the currently received payload block should generally be inverted. However, If the symbol weight of the currently received payload block and the running symbol weight disparity of the number of previously received payload blocks have an opposite polarity, then symbols in the currently received payload block should generally not be inverted.

For a $2^n$ PAM system the maximum running symbol weight disparity of a symbol would be $(2^{n-1}-1)$. This may best be illustrated through an example. Thus, referring to FIG. 7, there is shown a table containing all possible symbol configurations in a 4-PAM signaling system in the first column, the weight of each of the 4-PAM symbols in the second column, and the respective inverted symbol configurations in the third column.

Figure 8:
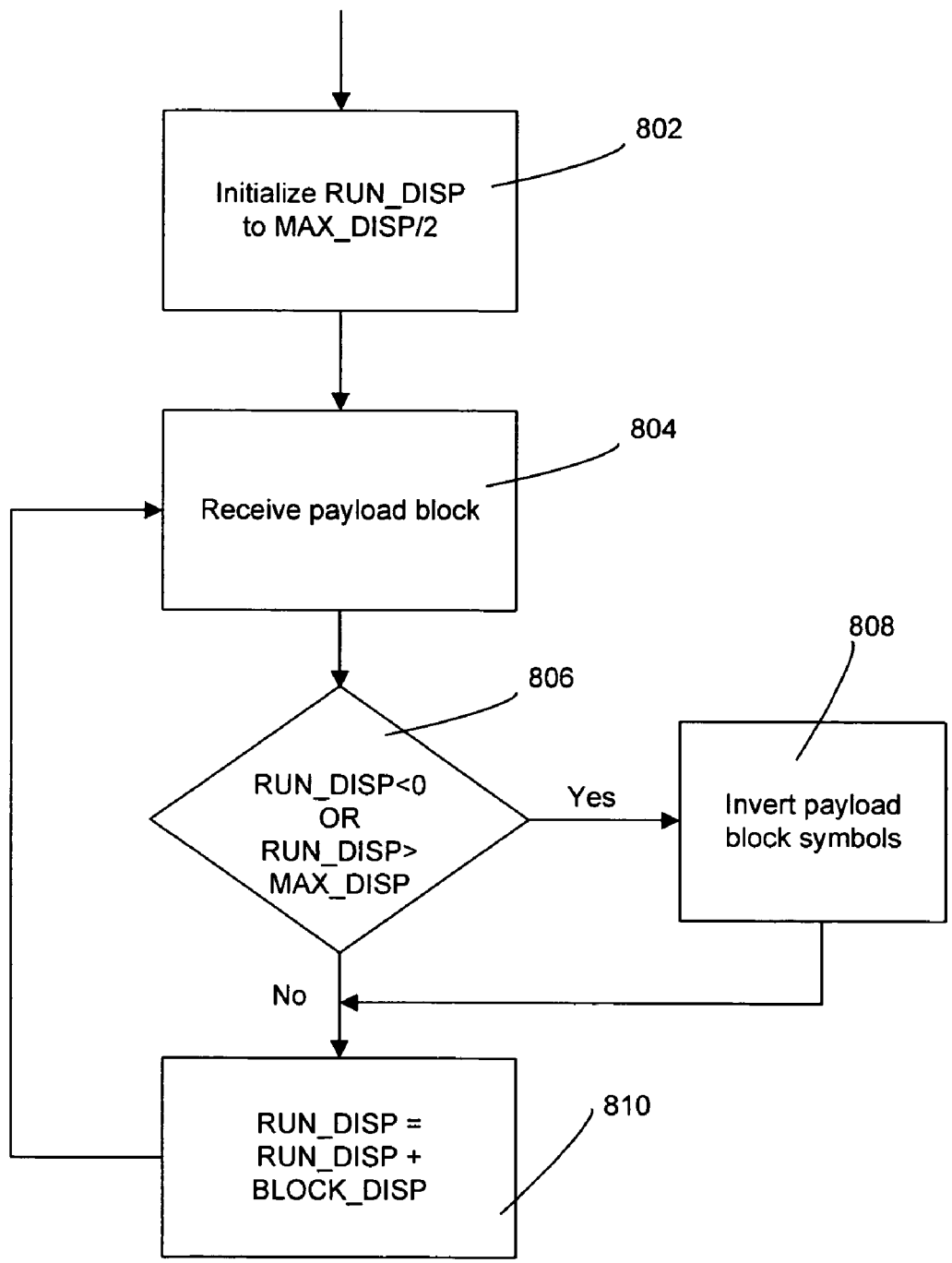
FIG. 8 shows an encoding algorithm which may be performed by the DC balancer of FIG. 3 in accordance with an embodiment of the present disclosure.

To perform the DC balancing process, the DC balancer 306 may maintain two separate registers: 1.) a programmable maximum symbol weight disparity register (i.e., a MAX_DISP register, wherein MAX_DISP/2>(Number of symbols in one payload block)*(Maximum symbol weight disparity)); and 2.) a running symbol weight disparity register (i.e., a RUN_DISP register). The objective is to limit the total block weight disparity to less than the value in the MAX_DISP register. This may be accomplished by performing the algorithm set forth in FIG. 8. That is, as shown in FIG. 8, the DC balancer 306 first initializes the RUN_DISP register to the value of MAX_DISP/2 in step 802. Then, in step 804, the DC balancer 306 receives a payload block, and its symbol weight disparity is calculated. Next, in step 806, the DC balancer 306 determines whether the value in the RUN_DISP register is greater than the value of MAX_DISP/2 (i.e., RUN_DISP>MAX_DISP/2), or whether the value in the RUN_DISP register is less than zero (i.e., RUN_DISP<0). If so, then, in step 808, the DC balancer 306 inverts all the symbols in the payload block and generates an active inverted signal (i.e., Inverted in FIG. 3). Then, in step 810, the DC balancer 306 updates the RUN_DISP register with the symbol weight disparity of the current payload block. If not, the DC balancer 306 directly updates the RUN_DISP register with the symbol weight disparity of the current payload block in step 810. The DC balancer 306 then returns to step 804 to receives another payload block and calculate its symbol weight disparity.

At this point it should be noted that the DC balancer 306 is an optional feature of the low overhead encoder 300. Thus, the DC balancer 306 may be omitted from the low overhead encoder 300 in alternative embodiments. Alternatively, the DC balancer 306 may not always operate even when present in the low overhead encoder 300. For example, the DC balancer 306 may not operate when the low overhead encoder 300 is otherwise operating in accordance with the low overhead 64b/66b coding technique. That may be the case since there are only 2 frame bits used in the low overhead 64b/66b coding technique, and those are already used to guarantee that at least two transitions are present in every payload/framing block and to indicate whether the payload block is a control payload or a data payload. Thus, the 2 frame bits in the low overhead 64b/66b coding technique may not be able to include any additional information regarding whether the DC balancer 306 inverted the symbols in the payload block.

Figure 9:
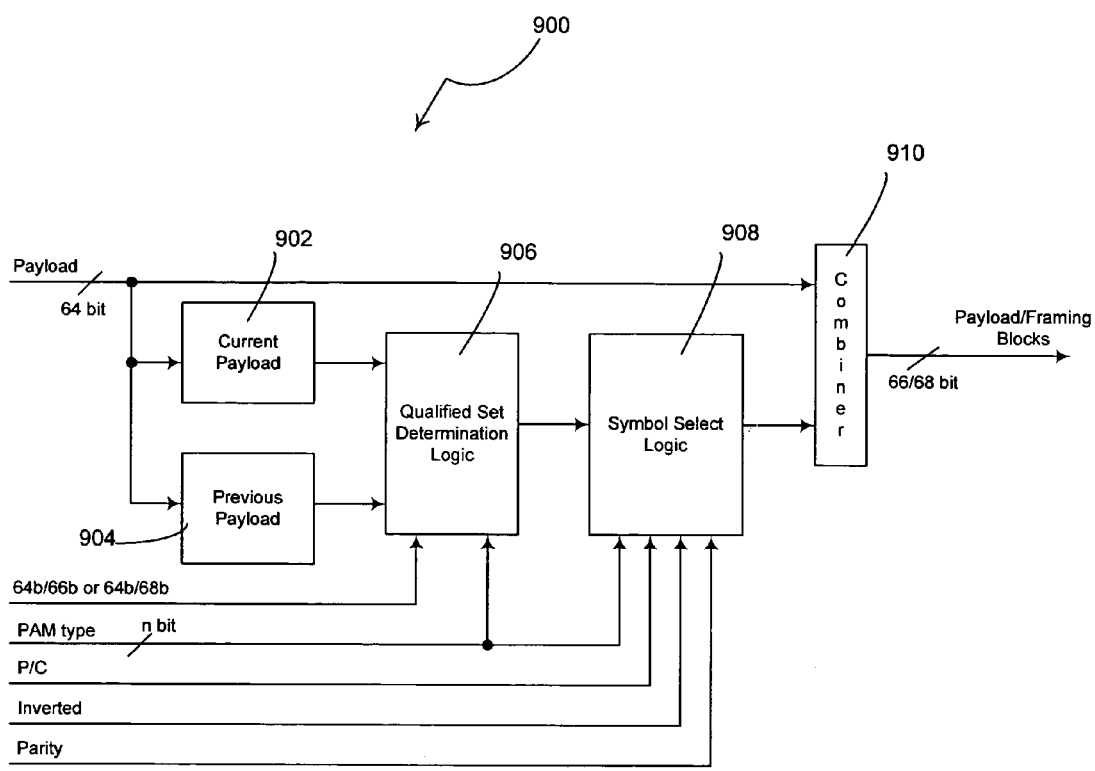
FIG. 9 shows a frame bit processor that may be used in the low overhead encoder of FIG. 3 in accordance with an embodiment of the present disclosure.

Referring to FIG. 9, there is shown a frame bit processor 900 that may be used in the low overhead encoder 300 of FIG. 3 in accordance with an embodiment of the present disclosure. The frame bit processor 900 comprises a current payload register 902, a previous payload register 904, qualified set determination logic 906, symbol select logic 908, and a combiner 910. The current payload register 902 stores a current 64-bit payload block currently received from the DC balancer 306. The previous payload register 904 stores a previous 64-bit payload block previously received from the DC balancer 306. Both the current 64-bit payload block stored in the current payload register 902 and the previous 64-bit payload block stored in the previous payload register 904 are provided to the qualified set determination logic 906.

The qualified set determination logic 906 receives the current payload register 902 and the previous 64-bit payload block stored in the previous payload register 904, as well as the coding mode signal (i.e., 64b/66b or 64b/68b) and the n-bit PAM type signal (i.e., PAM type). As described above, the state of the coding mode signal (i.e., 64b/66b or 64b/68b) indicates the coding mode in which the low overhead encoder 300 is to operate. As also described above, the n-bit PAM type signal (i.e., PAM type) indicates the level of PAM signaling in which the low overhead encoder 300 is to operate.

Figure 10:
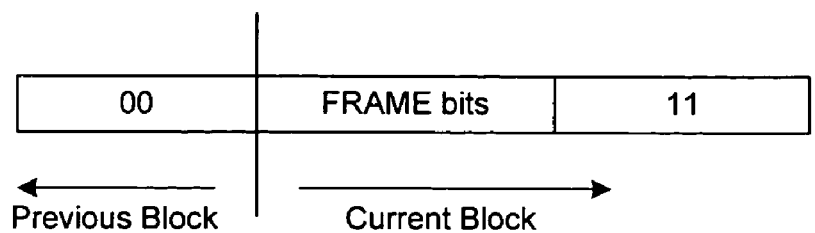
FIG. 10 is a table containing 4 possible frame bit combinations when the low overhead encoder of FIG. 3 is operating in accordance with a 4-PAM signaling scheme and a low overhead 64b/66b coding technique in accordance with an embodiment of the present disclosure.

Based upon the inputs just described, the qualified set determination logic 906 generates qualified sets of frame bit combinations. That is, the frame bits provide a transition between the symbol containing the frame bits and adjacent symbols. The second reason for the frame bits is to allow framing at a receiver. Such framing is possible because not all available frame bit combinations are used. Some frame bit combinations are disqualified because they do not guarantee that at least two transitions will be present in every payload/framing block. For example, referring to FIG. 10, assuming a last symbol of a previous payload is "00" and a first symbol of a current payload is "11", when the low overhead encoder 300 is operating in accordance with a 4-PAM signaling scheme and the low overhead 64b/66b coding technique, there are 4 possible frame bit combinations. However, as shown in FIG. 10, only 2 of the 4 possible frame bit combinations are qualified frame bit combinations (i.e., a first frame bit combination (01) indicating that the payload block is a data payload, and a second frame bit combination (10) indicating that the payload block is a control payload). The two remaining frame bit combinations are unqualified as their use would not guarantee that at least two transitions will be present in the current payload/framing block.

Alternatively, referring to FIG. 11, again assuming a last symbol of a previous payload is "00" and a first symbol of a current payload is "11", when the low overhead encoder 300 is operating in accordance with a 4-PAM signaling scheme and the low overhead 64b/68b coding technique, there are 16 possible frame bit combinations. However, as shown in FIG. 11, only 8 of the 16 possible frame bit combinations are qualified frame bit combinations (i.e., a first frame bit combination (0100) indicating that the payload block is a data payload with odd parity, and a second frame bit combination (0101) indicating that the payload block is a control payload with odd parity, a third frame bit combination (0110) indicating that the payload block is an inverted data payload with odd parity, a fourth frame bit combination (1000) indicating that the payload block is an inverted control payload with odd parity, a fifth frame bit combination (1001) indicating that the payload block is an data payload with even parity, a sixth frame bit combination (1010) indicating that the payload block is a control payload with even parity, a seventh frame bit combination (1100) indicating that the payload block is an inverted data payload with even parity, and an eighth frame bit combination (1101) indicating that the payload block is an inverted control payload with even parity). Out of the 8 remaining frame bit combinations, 7 are unqualified as their use would not guarantee that at least two transitions will be present in the current payload/framing block. That is, if the last 4-PAM symbol in a previous payload block is 00, then the first 4-PAM symbol in the frame bits cannot be 00. Also, if the first 4-PAM symbol in the current payload block is 11, then the second 4-PAM symbol in frame bits cannot be 11.

Referring again to FIG. 9, the symbol select logic 908 receives the qualified sets of frame bit combinations from the qualified set determination logic 906, as well as the n-bit PAM type signal (i.e., PAM type), the payload/control (P/C) signal, the inverted signal (i.e., Inverted), and a parity signal (i.e., Parity). As described above, the n-bit PAM type signal (i.e., PAM type) indicates the level of PAM signaling in which the low overhead encoder 300 is to operate. As also described above, the state of the payload/control (P/C) signal indicates whether a corresponding 64-bit payload block is a control payload or a data payload. As further described above, the state of the inverted signal (i.e., Inverted) indicates whether symbols in a corresponding 64-bit payload block have been inverted. The state of the parity signal (i.e., Parity) indicates whether a corresponding 64-bit payload block has even parity or odd parity.

Figure 12:
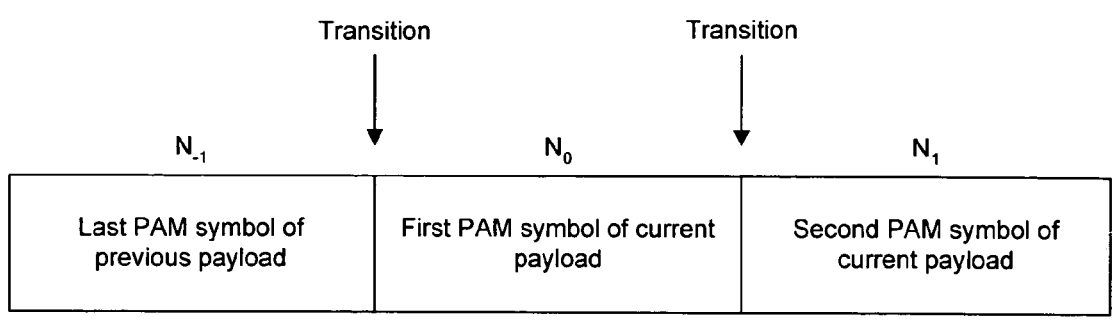
FIG. 12 illustrates transitions between symbols encoded in accordance with an embodiment of the low overhead coding technique of the present disclosure.

Based upon the inputs just described, the symbol select logic 908 selects the appropriate symbol(s) for inclusion in the frame bits of each payload/framing block so as to guarantee that at least two transitions will be present in every payload/framing block. That is, to guarantee that at least two transitions will be present in every payload/framing block, the symbol select logic 908 selects the appropriate symbol(s) for inclusion in the frame bits of each payload/framing block such that a first PAM symbol in a current payload block is not equal to: 1.) a last PAM symbol from a previous payload block; or 2.) a second PAM symbol of the current payload block (i.e., the first PAM symbol in the current payload block contains frame bits). For example, referring to FIG. 12, the symbol select logic 908 selects the appropriate symbol(s) for inclusion in the frame bits of each payload/framing block such that a first symbol of a current payload block ($N_0$) does not equal a last symbol of a previous payload block ($N_{-1}$) or a second PAM symbol of the current payload block ($N_1$). For example, when the low overhead encoder 300 is operating in accordance with a 4-PAM signaling scheme and the low overhead 64b/66b coding technique, when the last 4-PAM symbol of a previous payload block is 00 and the second 4-PAM symbol in a current payload block is 11, then the symbol select logic 908 selects the appropriate symbol for inclusion in the frame bits of the current payload/framing block (i.e., 01 or 10).

When the low overhead encoder 300 is operating in accordance with a 2-PAM signaling scheme (e.g., using the low overhead 64b/66b coding technique), the choices of symbols for inclusion in the frame bits of each payload/framing block yield a minimum of one transition. However, for all the other PAM signaling schemes (i.e., 4-PAM or more), the low overhead encoder 300 insures that there is always a transition with the symbols adjacent to the frame bit symbol(s). Referring to FIG. 13, there is shown a table listing the rules for the low overhead encoder 300 when operating in accordance with all $2^n$ PAM signaling schemes and one of the low overhead 64b/66b coding technique and the low overhead 64b/68b coding technique.

Referring again to FIG. 3, the parity signal (i.e., Parity) is generated by the parity calculator 308. That is, the parity calculator 308 receives a 64-bit payload block from the DC balancer 306. The parity calculator 308 then calculates the parity of the received 64-bit payload block. For example, if an even number of logic "1" values are present in the 64-bit payload block, then the parity signal (i.e., Parity) is set to logic "0" to indicate odd parity. Alternatively, if an odd number of logic "1" values are present in the 64-bit payload block, then the parity signal (i.e., Parity) is set to logic "1" to indicate odd parity. The state of the parity signal (i.e., Parity) is encoded into the frame bits.

Figure 14:
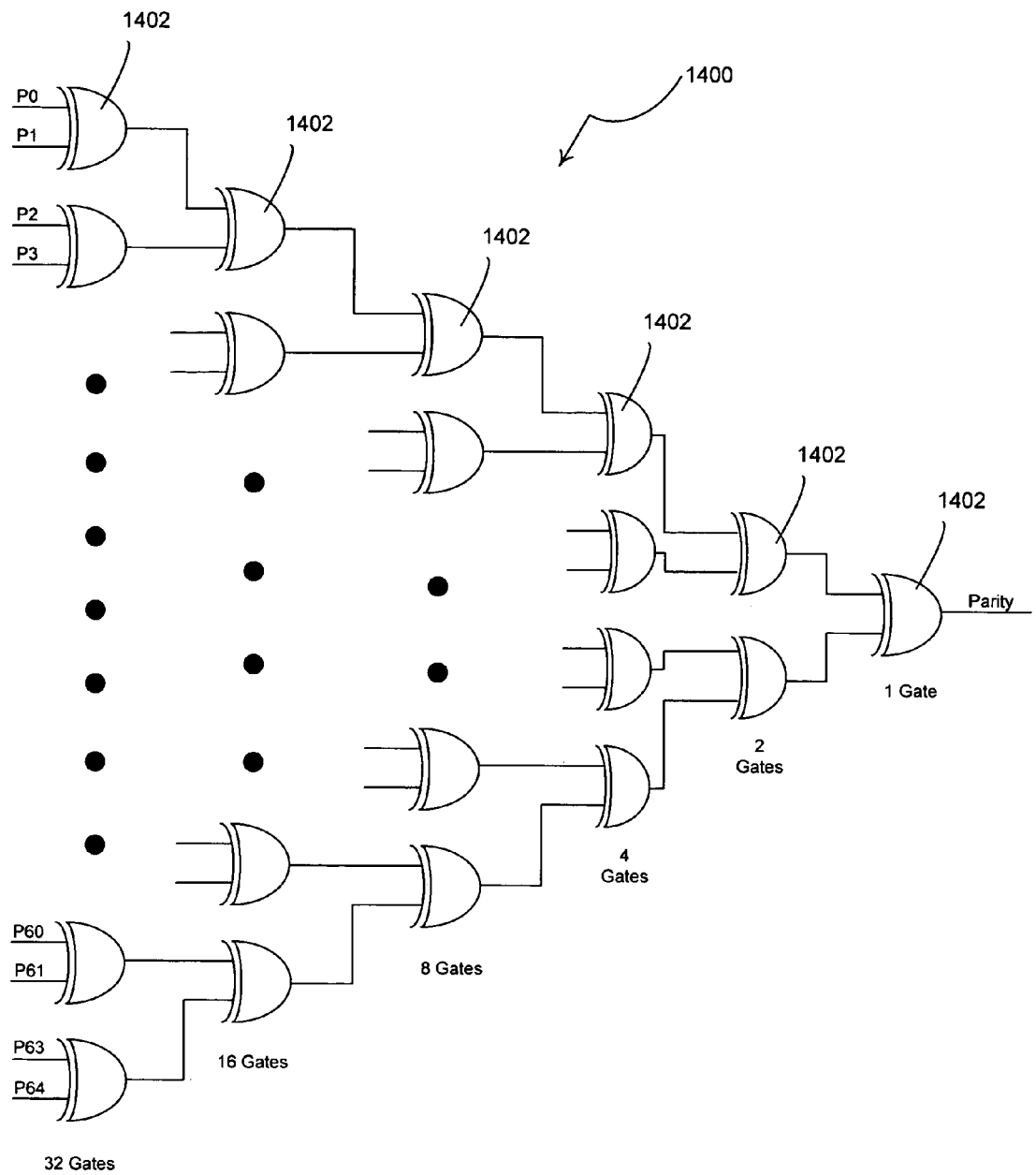
FIG. 14 shows a parity calculator that may be used in the low overhead encoder of FIG. 3 in accordance with an embodiment of the present disclosure.

Referring to FIG. 14, there is shown an odd parity calculator 1400 that may be used in the low overhead encoder 300 of FIG. 3 in accordance with an embodiment of the present disclosure. The odd parity calculator 1400 comprises a plurality of exclusive "OR" logic devices 1402 for calculating the parity of a 64-bit payload block (i.e., P0, P1, P2, . . . P63), which is reflected the parity signal (i.e., Parity), and then included in the qualified frame bits in the symbol select logic 908.

Referring again to FIG. 9, the combiner 910 receives a 64-bit payload block from the DC balancer 306 and qualified frame bits from the symbol select logic 908 and generates a payload/framing block from the combination thereof. The generated payload/framing block is then output from the low overhead encoder 300.

At this point it should be noted that the low overhead encoder 300 supports encoding of bonded and unbonded protocols. In the case of bonded protocols, only certain combinations of control (K) characters and ordered sets can occur. For example, referring to FIG. 15, the total number of control (K) characters supported is 12, which requires 4 bits of encoding. The four remaining combinations may be reserved for other uses.

Figure 15:
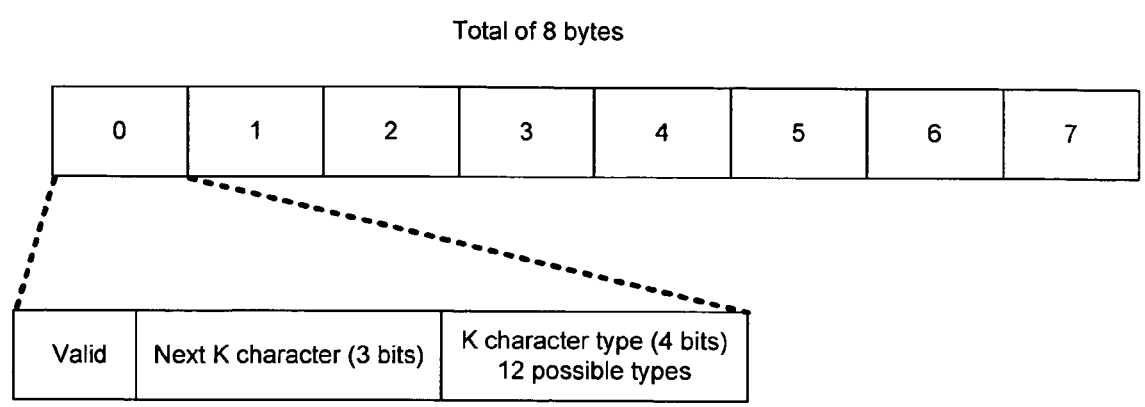
FIG. 15 illustrates control character assignment in a payload block encoded in accordance with an embodiment of the low overhead coding technique of the present disclosure.

In the case of unbonded protocols, which is particularly useful for multiplexing devices having multiple thin data streams, any combination of control (K) characters and ordered sets can occur. When encoding unbonded protocols, a link list method may be used. For example, if one or more control (K) characters occur in the payload block, then the frame bits are encoded to denote a control payload. Also, the first control (K) byte in the payload block is exchanged with a first data byte (i.e., byte 0 in FIG. 15). The control (K) byte may then be coded as shown in FIG. 15. If this is the only control (K) byte in the payload block, then a valid bit is set to 0. The next control (K) character indicates the location where it originally belonged. If there is another control (K) character, then it may be linked to a next control (K) character. The last control (K) character has a valid bit set to 0 and indicates the original location of the first control (K) character before swapping with the first data byte.

The low overhead encoder 300 is particularly beneficial when used in bandwidth limited channels which cannot endure the large overhead of 25% associated with 8b/10b coding schemes. For example, the low overhead encoder 300 may be used in a serial transceiver multiplexing device for running legacy backplanes at higher rates. Multiple input streams may be multiplexed. Since the number of backplane traces may remain the same, an input device may multiplex physical input streams so that data can be transmitted over those same number of backplane traces.

Figure 16:
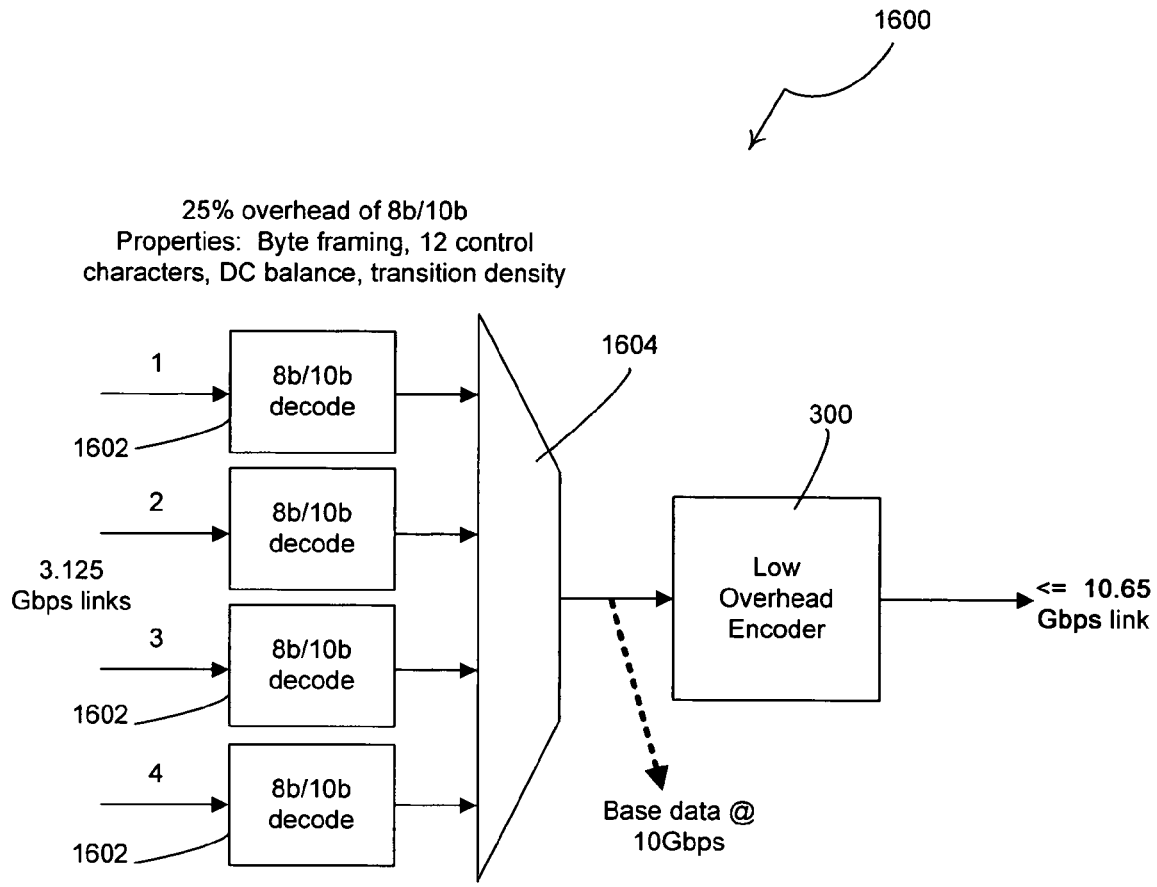
FIG. 16 shows a first system wherein the low overhead encoder of FIG. 3 may be beneficially employed in accordance with an embodiment of the present disclosure.

Referring to FIG. 16, the low overhead encoder 300 may be beneficially employed in a system 1600 having XAUI (i.e., 10 GigE) protocol data being transmitted over 4 serial links. After the 4 serial links are decoded in four 8b/10b decoders 1602, respectively, and then combined in a multiplexer 1604, they may be transmitted using the low overhead encoder 300 with much less bandwidth than the required 12.5 Gbps associated with another 8b/10b coding scheme. Instead, the low overhead encoder 300 can transmit the data using only 10.625 Gbps bandwidth when operating in accordance with the low overhead 64b/68b coding technique.

Figure 17:
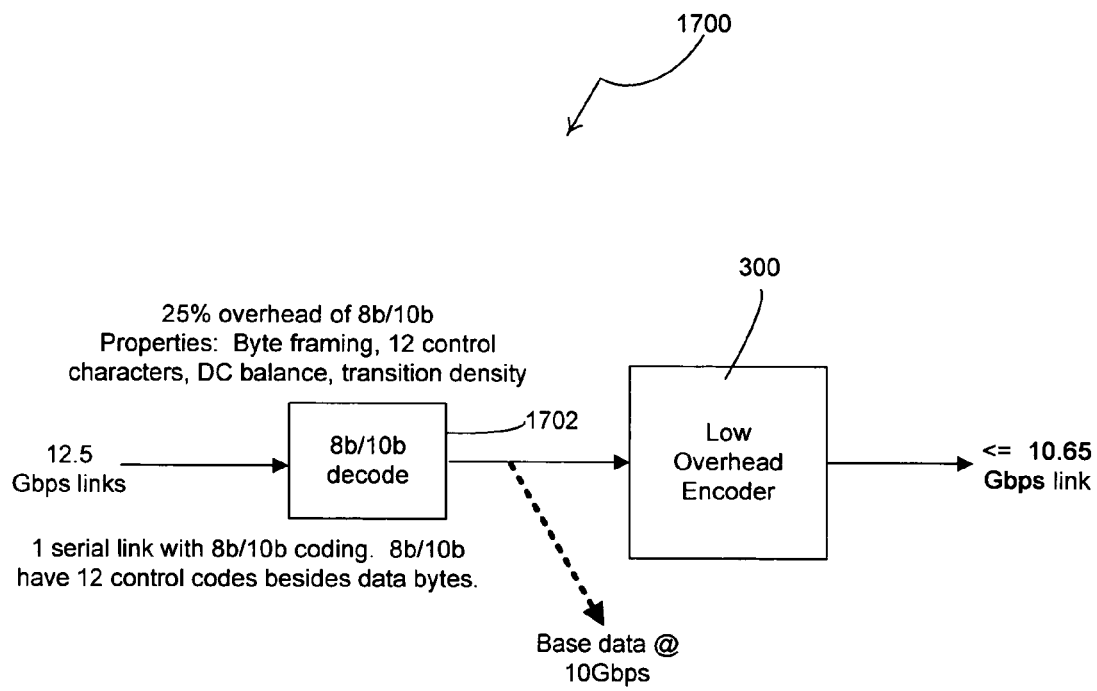
FIG. 17 shows a second system wherein the low overhead encoder of FIG. 3 may be beneficially employed in accordance with an embodiment of the present disclosure.

Referring to FIG. 17, the low overhead encoder 300 may be beneficially employed in a system 1700 wherein data is being received over a high bandwidth channel with 8b/10b coding and then must be transmitted over a bandwidth limited channel. After the data is decoded in an 8b/10b decoder 1702, thereby removing the 25% overhead associated with the 8b/10b coding scheme, the data may then be transmitted using the low overhead encoder 300 over the bandwidth limited channel.

At this point it should be noted that low overhead coding in accordance with the present disclosure may also include decoding a received payload/framing block. Such decoding may comprise detecting the framing bits in a received payload/framing block, and then separating the framing bits from the payload block.

At this point it should be noted that low overhead coding in accordance with the present disclosure as described above typically involves the processing of input data and the generation of output data to some extent. This input data processing and output data generation may be implemented in hardware or software. For example, specific electronic components may be employed in an encoder or similar or related circuitry for implementing the functions associated with low overhead coding in accordance with the present disclosure as described above. Alternatively, one or more processors operating in accordance with stored instructions may implement the functions associated with low overhead coding in accordance with the present disclosure as described above. If such is the case, it is within the scope of the present disclosure that such instructions may be stored on one or more processor readable carriers (e.g., a magnetic disk), or transmitted to one or more processors via one or more signals.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the following appended claims. Further, although the present disclosure has been described herein in the context of a particular implementation in a particular environment for a particular purpose, those of ordinary skill in the art will recognize that its usefulness is not limited thereto and that the present disclosure can be beneficially implemented in any number of environments for any number of purposes. Accordingly, the claims set forth below should be construed in view of the full breadth and spirit of the present disclosure as described herein.

The invention claimed is:

1. A method for coding information, the method comprising:
   receiving a block of information;
   detecting no control characters in the block of information; and
   encoding the block of information such that a first value of a first symbol in the encoded block of information is not equal to either a second value of an adjacent second symbol in the encoded block of information or a third value of an adjacent last symbol in a previously encoded block of information, wherein the encoded block of information is formed with N bits that are evenly divided into M total symbols, wherein N=nM, wherein n represents a number of bits in each symbol, wherein the encoded block of information includes P framing bits represented by one or more of the M total symbols, wherein the P framing bits are selected to indicate a lack of at least one detected control character.

2. The method of claim 1, wherein each of the M total symbols represents two bits.

3. The method of claim 1, wherein N=66 and P=2.

4. The method of claim 1, wherein N=68 and P=4.

5. The method of claim 1, further comprising:
  detecting at least one control character in the block of information; and
  selecting the P framing bits to indicate the at least one detected control character.

6. The method of claim 5, wherein the step of encoding comprises:
  additionally encoding the block of information having the at least one control character.

7. The method of claim 6, further comprising:
  calculating the parity of the additionally encoded block of information.

8. The method of claim 7, further comprising:
  further selecting the P framing bits to indicate the calculated parity.

9. The method of claim 6, further comprising:
  inverting the symbol values of the additionally encoded block of information.

10. The method of claim 9, further comprising:
  further selecting the P framing bits to indicate the inverted symbol values.

11. The method of claim 9, further comprising:
  calculating the parity of the inverted additionally encoded block of information.

12. The method of claim 11, further comprising:
  further selecting the P framing bits to indicate the calculated parity.

13. The method of claim 9, further comprising:
  scrambling the additionally encoded block of information prior to being inverted.

14. The method of claim 1, wherein the step of encoding comprises:
  bypassing an addition encoding of the block of information based upon the lack of at least one detected control character.

15. The method of claim 14, further comprising:
  calculating the parity of the bypassed block of information.

16. The method of claim 15, further comprising:
  further selecting the P framing bits to indicate the calculated parity.

17. The method of claim 14, further comprising:
  inverting the symbol values of the bypassed block of information.

18. The method of claim 17, further comprising:
  further selecting the P framing bits to indicate the inverted symbol values.

19. The method of claim 17, further comprising:
  calculating the parity of the inverted bypassed block of information.

20. The method of claim 19, further comprising:
  further selecting the P framing bits to indicate the calculated parity.

21. The method of claim 17, further comprising:
  scrambling the bypassed block of information prior to being inverted.

22. The method of claim 1, further comprising:
  detecting the P framing bits in the encoded block of information; and
  separating the P framing bits from the block of information.

* * * * *